United States Patent [19]
LaPointe

[11] Patent Number: 5,721,712
[45] Date of Patent: Feb. 24, 1998

[54] AIRCRAFT DETECTION SYSTEM

[75] Inventor: Kenneth M. LaPointe, Narragansett, R.I.

[73] Assignee: The United States of America as represented by the Secretary of the Navy, Washington, D.C.

[21] Appl. No.: 695,841

[22] Filed: Aug. 5, 1996

[51] Int. Cl.$^6$ ..................................................... H04B 1/06
[52] U.S. Cl. ........................ 367/118; 367/136; 367/906
[58] Field of Search .................................. 367/118, 129, 367/136, 135, 120, 906, 124, 125, 126, 127

[56] References Cited

U.S. PATENT DOCUMENTS 5,060,206  10/1991  DeMetz, Sr. ............................ 367/136

Primary Examiner—Daniel T. Pihulic
Attorney, Agent, or Firm—Michael J. McGowan; Michael F. Oglo; Prithvi C. Lall

[57] ABSTRACT

A covert aircraft detection system for a submarine is described which includes an acoustic antenna array and a signal processor to process the acoustic signals to provide the location of the detected aircraft and to classify the detected aircraft. The acoustic antenna array is mounted on the submarine mast and includes a vertically extending rod having a microphone and connected thereto three or more folding legs having microphones connected thereto. The microphones detect the aircraft acoustic signals and these signals are transferred to the signal processor which provides the location of the aircraft and matches the acoustic signal with the database of aircraft acoustic signals to classify the type of aircraft. When the acoustic antenna array is connected to a rotatable mast, such as a periscope, a rotary encoder and mast bearing indicator are utilized to account for the rotation of the acoustic antenna array and the rotation of the mast, respectively.

7 Claims, 1 Drawing Sheet

5,721,712

AIRCRAFT DETECTION SYSTEM

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates to an improved aircraft detection system and more particularly to a submarine mast mounted acoustic aircraft detection system which is covert in its deployment and use.

2. Description of the Prior Art

Submarines operating close to coastal areas need enhanced capabilities to detect airborne airplanes and helicopters. Use of radar systems for detection of aircraft do not allow the submarine to remain covert. Accordingly, there is a need for an aircraft detection system for submarines which provides a covert ability to detect and classify aircraft.

A search has been conducted of the United States Patent Office records and certain patents have been cited as further illustrative of the art. These patents are: J. C. Fox, entitled "Folding Antenna", U.S. Pat. No. 3,107,353; M. McCorkle, entitled "Submarine Mounted Telescoping Antenna", U.S. Pat. No. 3,158,865; H. C. Beck et al., entitled "Support Structure for Underwater Sensing Equipment", U.S. Pat. No. 3,160,847; Bush et al., entitled "Synchronously Deployable Truss Structure", U.S. Pat. No. 4,578,920; and Dietrich et al., entitled "Cardan Suspension for Microphones for Sound Ranging in Water", U.S. Pat. No. 4,674,075.

SUMMARY OF THE INVENTION

A primary object of the invention is to provide an aircraft detection system.

Another primary object of the invention is to provide a submarine mast mounted aircraft detection system employing an acoustic antenna array. Since current helicopters and aircraft are quite loud, detection and classification of the aircraft can be made based on their acoustic emissions.

Another object of the invention is to provide a submarine mast mounted aircraft detection system employing an acoustic antenna array which is covert in its deployment and use.

The aircraft detection system of the invention includes an acoustic antenna array and a signal processor to process the acoustic signals to provide the location of the detected aircraft, and to classify the detected aircraft. The acoustic antenna array is mounted on the submarine mast and includes a vertically extending rod having a microphone and connected thereto three or more folding legs having microphones connected thereto. The microphones detect the aircraft acoustic signals and these signals are transferred to the signal processor which provides the location of the aircraft and matches the acoustic signal with the database of aircraft acoustic signals to classify the type of aircraft. When the acoustic antenna array is connected to a rotatable mast, such as a periscope, a rotary encoder and mast bearing indicator are utilized to account for the rotation of the acoustic antenna array and the rotation of the mast, respectively. In operation, the folding legs of the acoustic antenna array are extended and retracted by a drive means. When the submarine mast rises above the water surface, the legs are in a closed position parallel to the mast. The microphones are turned on in a cuing mode to determine whether aircraft are present. If aircraft are detected, the folding legs are extended to provide radial separation of the microphones. Once extended, the microphones listen to detect the specific acoustic signal of the aircraft. The acoustic signal received by the microphones is fed into the signal processor which triangulates the acoustic data to provide the bearing of the aircraft and also matches the acoustic signature of the aircraft to classify the type of aircraft.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
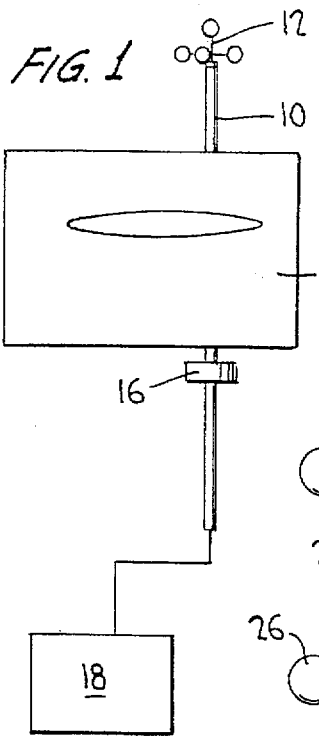
FIG. 1 is a schematic showing the aircraft detection system of the invention.

Referring now to the drawings in detail, reference is made first to FIG. 1. It will be seen that there is provided an aircraft detection system comprising a submarine mast 10, an acoustic antenna array 12, a rotary encoder 14, a mast bearing indicator 16, and a signal processor 18. These components of the aircraft detection system operate in conjunction to detect an aircraft from a submarine in a covert manner as described in further detail hereafter.

The submarine mast 10 can be rotating or non-rotating. Preferably, the mast 10 to which the acoustic antenna array means 12 is connected is a rotating periscope and will be described as such in this preferred embodiment.

Figure 2:
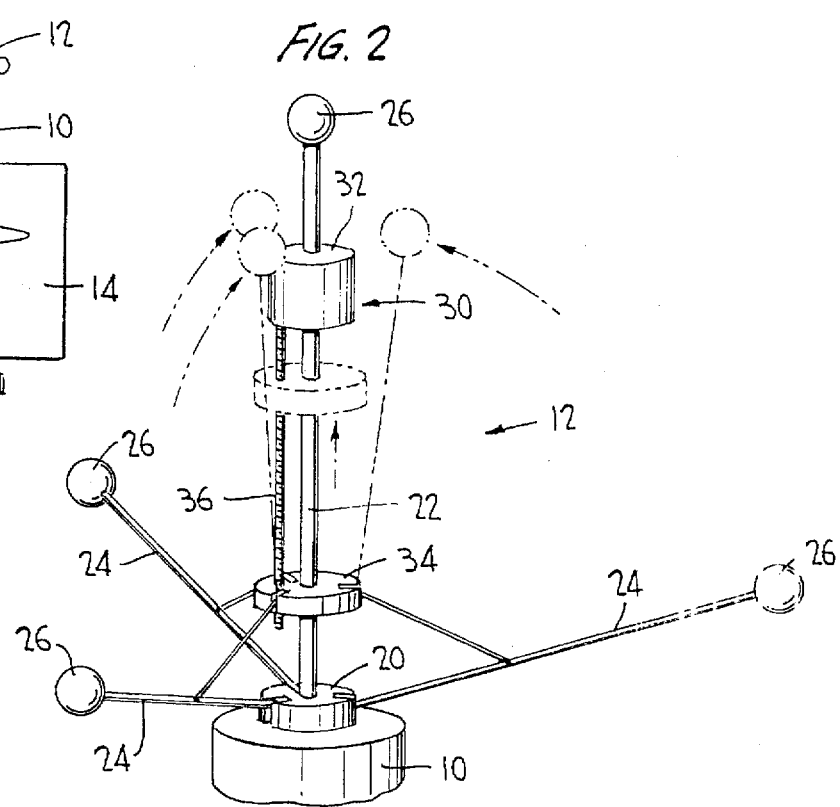
FIG. 2 is side view of the acoustic antenna array.

Connected to the mast 10 is an acoustic antenna array 12 as shown, for example, in FIG. 2. Acoustic antenna array 12 includes a mounting plate 20 connected to the mast. Mounting plate 20 includes a vertically extending rod 22 and folding legs 24. In the preferred embodiment, the invention employs three folding legs 24, although a different number may be utilized. Connected to the ends of rod 22 and folding legs 24 are microphones 26. Acoustic antenna array 12 includes a drive means 30 to raise and lower the folding legs 24. Folding legs 24 are shown raised in FIGS. 3 and 4 and lowered, i.e., deployed, in FIG. 5.

Drive means 30 includes an electric motor 32, a disk 34 which is vertically movable on rod 22 and to which folding legs 24 are connected and a drive shaft 36. Drive shaft 36 is connected to the electric motor 32 and disk 34. Motor 32 drives shaft 36 to lower disk 34 and thereby extend folding legs 24 into the deployed position and to raise disk 34 and thereby retract folding legs 24 in a non-deployed position.

The aircraft detection system of the invention includes a rotary encoder 14. The rotary encoder 14 measures the rotation of the acoustic antenna array. Generally, it includes (not shown) a wheel mounted on the mast. The rotary encoder 14 takes into account the rotary movement of the acoustic antenna array 12 and sends information to the signal processor 18 in order to accurately locate a detected aircraft.

The aircraft detection system further includes a mast bearing indicator 16 which is used in conjunction with a rotating periscope. It is not needed for a fixed mast. The bearing indicator measures the bearing of the detected aircraft in relation to the submarine and correlates the bearing of the detected aircraft with respect to the movement of the periscope as it rotates.

Figure 3:
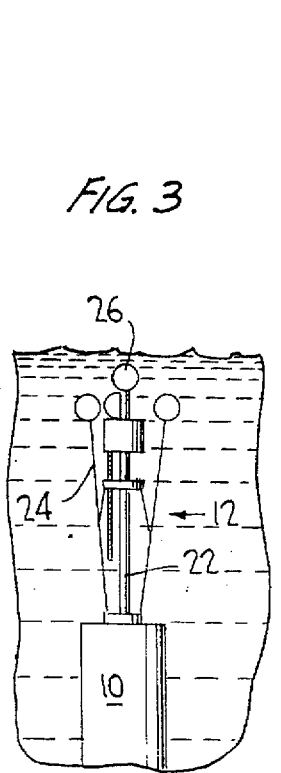
FIG. 3 is a side view of the acoustic antenna array on a submarine mast beneath the water surface.
Figure 4:
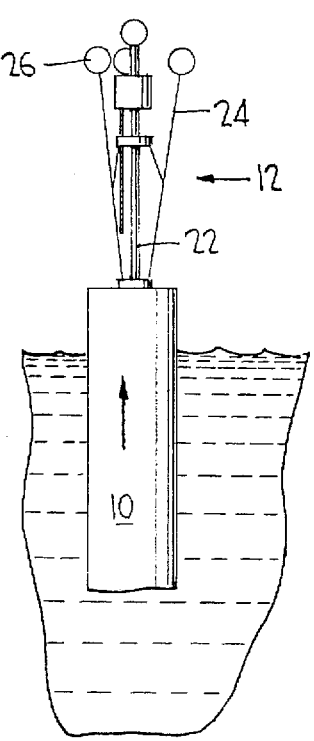
FIG. 4 is a further side view of the acoustic antenna array of FIG. 3 showing the mast above the water surface in a cuing mode.
Figure 5:
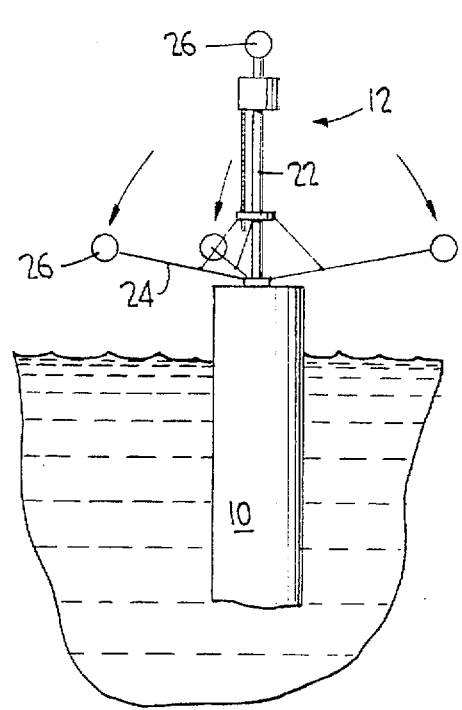
FIG. 5 is a side view of the acoustic antenna array of the invention of FIG. 4 after being deployed.

The acoustic antenna array 12 is connected to signal processor 18. Signal processor 18 in conjunction with microphones 26, the rotary encoder 14 and bearing indicator 16 serve to detect the noise of the aircraft and then locate the bearing of the aircraft in relation to the submarine. The signal processor further matches the acoustic signature of the aircraft to classify the aircraft. Referring to FIG. 3, the mast 10 of the submarine is shown below the water surface. When the mast rises above the water surface as shown in FIG. 4, the folding legs 24 are maintained in the retracted position. At this point, the microphones are turned on to listen for aircraft noise and are in a cuing mode. If an aircraft is detected, the folding legs 24 are extended, as shown in FIG. 4, to provide radial separation of the microphones. Once extended, the microphones listen to detect the aircraft. The signal is fed to the signal processor 18 which, with the aid of the rotary encoder 14 and bearing indicator 16, triangulate the acoustic data from microphones 26 and provide the bearing of the aircraft and match the acoustic signature to classify the aircraft. Accordingly, the aircraft detection system of this invention provides a unique covert submarine aircraft detection capability.

Various design configurations can be used with the invention without impacting its uniqueness or detracting from its features.. For example, the system of the invention may include only one microphone for cuing purposes only or a larger multi-microphone system which has no moving parts but still provides the required microphone separation.

In light of the above, it is therefore understood that within the scope of the following claims, the invention may be practiced otherwise than as specifically described.

What is claimed is:

1. An aircraft detection system for a submarine comprising an acoustic antenna array for detecting sound including:

mounting means for mounting said acoustic antenna array to said submarine;

a vertically extending rod connected to said mounting means and having a microphone connected at about the free end of said rod;

at least three movable leg members connected to said mounting means and each of said leg members having a microphone connected at about the free end of each of said leg members;

a drive means for moving said movable leg members; and a signal processor operatively connected to said acoustic antenna array for processing sound detected said acoustic antenna array.

2. An aircraft detection system according to claim 1 wherein said submarine includes a rotating mast and said acoustic antenna array is mounted to said mast.

3. An aircraft detection system according to claim 2 further comprising a rotary encoder operatively connected to said acoustic antenna array.

4. An aircraft detection system according to claim 3 further comprising a bearing indicator operatively connected to said acoustic antenna array.

5. An aircraft detection system according to claim 1 wherein said drive means comprises a motor means, a drive shaft and a disk slidably connected to said vertically extending rod.

6. An acoustic antenna array for a submarine for detecting sound comprising:

a mounting means for mounting said acoustic antenna array to said submarine;

a vertically extending rod connected to said mounting means and having a microphone connected at about the free end of said rod;

at least three movable leg members connected to said mounting means and each of said leg members having a microphone connected at about the free end of each of said leg members; and a drive means for moving said movable leg members.

7. An acoustic antenna array for a submarine according to claim 6 wherein said drive means comprises a motor means, a drive shaft and a disk slidably connected to said vertically extending rod.

* * * * *